United States Patent [19]

Adams

[11] 4,082,297

[45] Apr. 4, 1978

[54] BYPASS FLUSH SYSTEM EMPLOYING THERMAL BUSHING

[75] Inventor: William V. Adams, Pavilion Township, Kalamazoo County, Mich.

[73] Assignee: Durametallic Corporation, Kalamazoo, Mich.

[21] Appl. No.: 767,169

[22] Filed: Feb. 9, 1977

[51] Int. Cl.² ............................................. F16J 15/16
[52] U.S. Cl. .................................... 277/15; 277/22; 277/26; 277/83
[58] Field of Search ................... 277/3, 15, 22, 26, 27, 277/81 R, 82, 83, 84, 85, 138, 147, 173, 174; 308/76, 77, 78, DIG. 14, 187, 187.1, 187.2

[56] References Cited

U.S. PATENT DOCUMENTS

| | | | |
|---|---|---|---|
| 2,937,039 | 5/1960 | Santapa | 277/26 |
| 2,948,555 | 8/1960 | Wright | 277/26 |
| 2,971,783 | 2/1961 | Laser | 277/26 |
| 2,995,390 | 8/1961 | Gardner | 277/26 |
| 3,477,729 | 11/1969 | Hershey | 277/15 X |
| 3,539,270 | 11/1970 | Derrickson | 277/15 X |
| 3,843,140 | 10/1974 | Mayer et al. | 277/15 X |

FOREIGN PATENT DOCUMENTS

| | | | |
|---|---|---|---|
| 357,087 | 9/1931 | United Kingdom | 277/22 |
| 722,535 | 1/1955 | United Kingdom | 277/26 |

Primary Examiner—Robert S. Ward, Jr.
Attorney, Agent, or Firm—Blanchard, Flynn, Thiel, Boutell & Tanis

[57] ABSTRACT

A bypass flush system for cooling and lubricating a mechanical seal assembly as used in association with a fluid handling apparatus, such as a centrifugal pump. A bypass line connects the mechanical seal assembly and the discharge side of the pump for permitting recirculation of a limited quantity of the fluid being pumped. To control the flow of bypass fluid, a flow control device is disposed between the seal assembly and the pumping chamber. The flow control device comprises a thermal bushing which permits the bypass system to operate with a minimum flow rate, while at the same time allowing accurate control of the small flow rate without the device becoming plugged with deposits and the like. Use of the thermal bushing for flow control also enables the bypass system to employ an air-cooled heat exchanger for cooling the fluid flowing through the bypass line. In a preferred embodiment, the thermal bushing has a thermal expansion rate slightly less than the thermal expansion rate of the shaft which it surrounds whereby the clearance between the shaft and the thermal bushing gradually and progressively decreases in response to temperature increases so as to maintain a substantially constant flow rate past the bushing.

9 Claims, 3 Drawing Figures

U.S. Patent
April 4, 1978
4,082,297
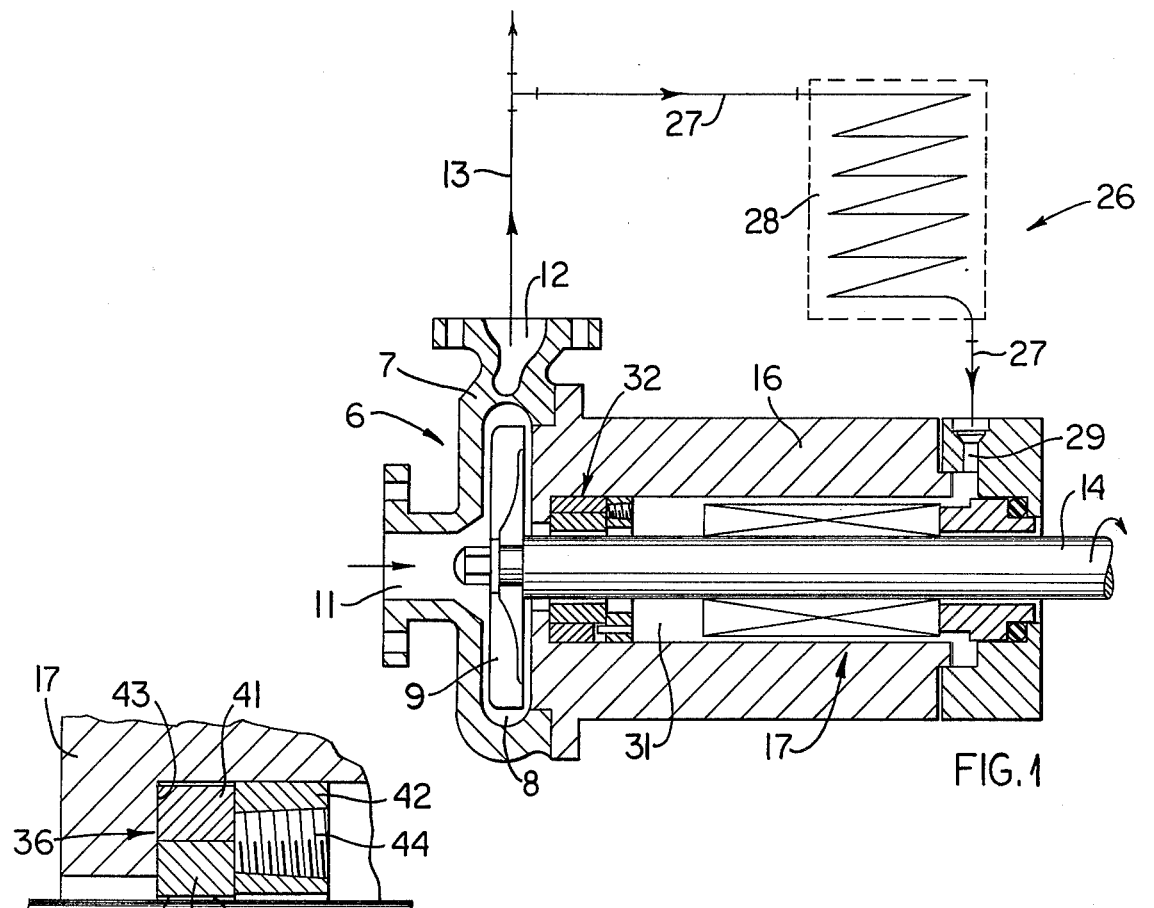
FIG. 1
FIG. 3
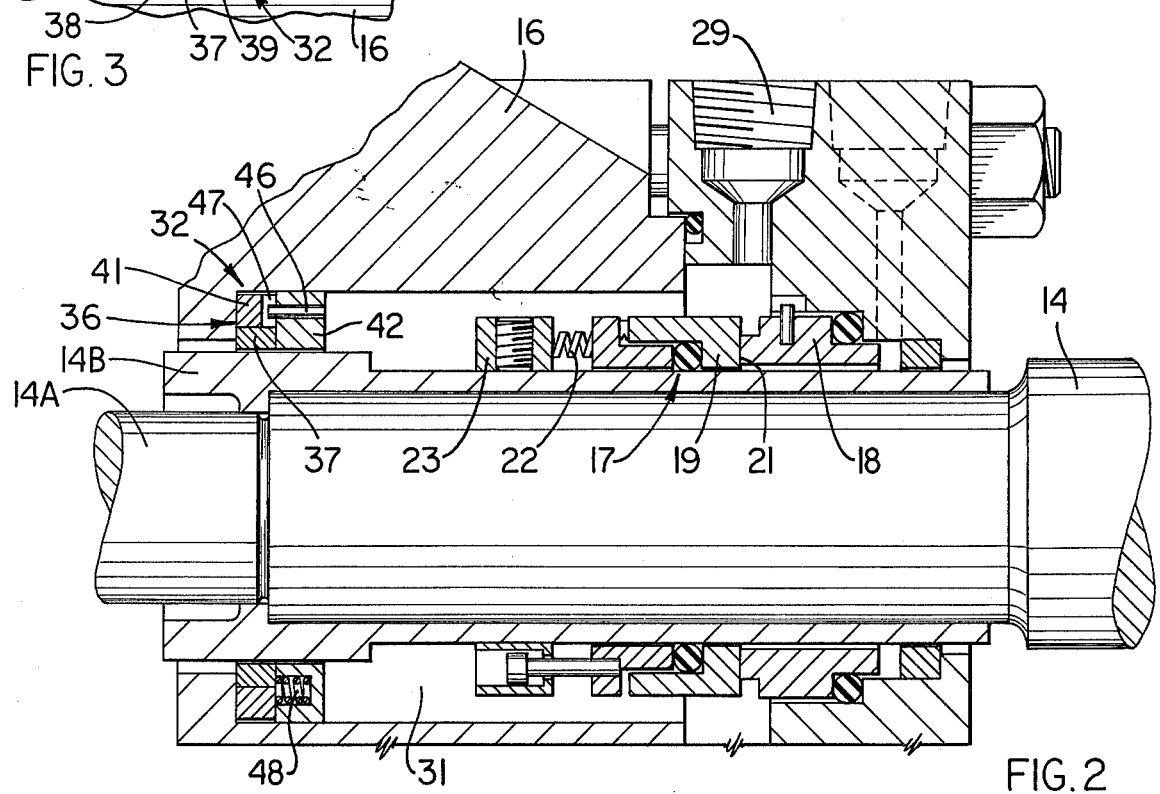
FIG. 2

BYPASS FLUSH SYSTEM EMPLOYING THERMAL BUSHING

FIELD OF THE INVENTION

This invention relates to an improved environmental control system for use in association with a mechanical seal assembly and, in particular, to a bypass flush system which employs a thermal bushing for controlling the flow rate of a flushing fluid.

BACKGROUND OF THE INVENTION

Both air-cooled heat exchangers and thermal bushings are known technology which have been utilized as separate items in the sealing industry for many years. However, to the best of my knowledge, the combined use of an air-cooled heat exchanger and a thermal bushing in an environmental control system for a mechanical seal assembly has never been attempted. Thus, this invention is concerned with an improved environmental control system, particularly a bypass flush system, which is believed to eliminate a long standing problem in the sealing industry.

Mechanical seal assemblies have long been utilized with fluid handling apparatus (such as pumps, autoclaves and the like) which are used in conjunction with high temperature and/or corrosive fluids, particularly in the chemical and petrochemical industries. In such utilizations, the mechanical seal assembly is normally provided with an environmental control system which supplies a fluid into the seal cavity to control the temperature thereof. This control system generally involves a bypass line which bleeds off of the main flow line at a location downstream of the pumping apparatus, which bypass line flows through an appropriate heat exchanger and then connects to the seal cavity. To control the rate at which the flushing fluid flows through the bypass line, it has been conventional to provide the bypass line with a flow valve located either upstream or downstream of the heat exchanger. This flow control valve normally comprises an orifice or an adjustable needle valve. While the required flow rate for the flushing fluid is preferably small, particularly since the flushing fluid is normally the same fluid being handled by the pumping apparatus, nevertheless experience indicates that proper operation of the bypass system requires that the flow rate be maintained rather large in order to ensure dependable operation thereof. More specifically, when handling high-temperature dirty fluids such as Dowtherm, Therminol, crude oil and the like, these fluids frequently carbonize or coke-out, thereby leaving debris in the system which deposits in the orifice or on the needle valve, thereby plugging the valve and rendering it useless. These deposits thus effectively close off the bypass system and prevent circulation of the flushing fluid through the seal cavity. To avoid this long standing problem, it has been conventional to utilize a substantially larger valve opening. This results in the flow rate through the bypass system being many times larger than required for a specific application. For example, flow rates of flushing fluid up to ten gallons per minute are conventionally utilized, whereas in many instances a maximum flow rate of approximately one-eighth to two gallons per minute is sufficient provided that the system can be properly controlled and maintained operational over long periods of time.

Because of the necessity of having to utilize large flow rates, as noted above, this in turn results in a large increase in the required capacity of the heat exchanger used in conjunction with the bypass line. Thus, attempting to utilize an air-cooled heat exchanger under these circumstances becomes totally impractical since the required cooling area of an air-cooled heat exchanger, coupled with the high initial cost and extreme size and space requirements, thus completely outweigh any of the practical advantages achieved by utilizing an air-cooled heat exchanger. Thus, bypass systems have normally utilized a water-cooled heat exchanger since same requires a cooling surface area which is 20 to 30 times less than that of an equivalent air-cooled heat exchanger. However, as is well known, water-cooled heat exchangers themselves create additional problems with respect to the necessity of having to handle an additional fluid, namely water, and the required piping, seals, pumps and other apparatus required therefore. In most instances, however, the large size of an equivalent air-cooled heat exchanger thus dictate the utilization of a watercooled heat exchanger, even though same does possess disadvantages.

While bypass systems of the above-described type have possessed the above-described disadvantages, nevertheless these systems have been utilized for many years since no one has, prior to the present invention, arrived at a simplified system which overcomes these disadvantages and yet results in a dependable, simple and economical system.

In known fluid handling apparatus employing mechanical seal assemblies, various types of seals have been provided between the mechanical seal cavity and the fluid handling apparatus. For example, attempts to prevent or at least minimize the communication between the pumping apparatus, such as the pumping chamber of a centrifugal pump, and the mechanical seal cavity have involved the use of fixed bushings, floating bushings, labyrinth seals and the like. While these seals have been primarily designed so as to attempt to prevent flow between the pumping chamber and the mechanical seal cavity, nevertheless minimizing or controlling the clearance within these seals is substantially impossible, so that a noncontrolled amount of fluid normally flows past these seals. These different seals, as mentioned above, have also created structure and wear problems which have made their usage less than desirable. These seals have accordingly not entered into the design of known bypass flush systems.

One of the problems associated with usage of a fixed bushing is the rubbing between the bushing and the rotatable shaft disposed therein, which results in excessive wear of the shaft. This thus has resulted in fixed bushings normally being constructed of soft metals or carbon, whereby the bushing is subject to the wear rather than the shaft. However, constructing the fixed bushing of carbon results in substantial differential thermal expansion between the shaft and the carbon bushing due to the dissimilar thermal expansion coefficients thereof, whereby the clearance between the bushing and the shaft undergoes substantial variation and hence excessive clearances must be provided between the shaft and the bushing at low temperatures. Because of these undesirable features of fixed bushings, their utilization has been extremely limited. Rather, floating bushings have been utilized more extensively since they radially float with the shaft and can thus be constructed of the same metal as the shaft to permit a uniform clearance to be maintained between the bushing and the shaft at all times, while at the same time not resulting in excessive shaft wear.

In addition to the use of both fixed and floating bushing seals for preventing leakage from the mechanical seal cavity, the sealing industry has also utilized so-called "Thermal bushings" for restricting flow from the mechanical seal cavity. Thermal bushings are a composite structure which attempts to utilize the best features of both the floating and fixed bushings.

The thermal bushing utilizes an inner sleeve of carbon or similar soft material. This inner carbon sleeve is shrunk into an outer steel sleeve which determines the expansion coefficient of the composite thermal bushing so that a substantially uniform clearance exists between the shaft and the thermal bushing at all times. At the same time, the inner carbon sleeve prevents undesirable shaft wear. Thermal bushings of this type are, however, normally utilized as a fixed bushing. Further, these known thermal bushings have, to the best of my knowledge, always been utilized as a seal for restricting the flow of a barrier fluid or the loss of a fluid from a vessel.

Accordingly, it is an object of the present invention to provide an improved environmental control system for use with a mechanical seal assembly, which control system is of the bypass flush type and is capable of handling hot, dirty liquids and employs a flow control device formed as a thermal bushing for permitting successful operation of the system while controlling flow of the flushing fluid at an extremely low rate. More specifically, it is an object of the invention to provide:

1. A bypass flush system for a mechanical seal assembly, as aforesaid, which permits the flow rate of the bypass flushing liquid, namely the hot dirty liquid, to be maintained at a rate several times smaller than previously felt feasible, such as a rate of two gallons per minute or less, and even less than one gallon per minute, without encountering sever maintenance problems due to plugging of the flow control device with dirt and deposits.

2. A system, as aforesaid, which employs a thermal bushing as the flow control device whereby an extremely low flow rate of flushing fluid can be continuously maintained therethrough, and wherein the clearance passage between the bushing and the shaft is maintained clean due to the vibration and rotation of the shaft.

3. A system, as aforesaid, which permits utilization of an air-cooled heat exchanger in association with the bypass line for cooling the flushing fluid flowing therethrough, which air-cooled heat exchanger can be of nominal size while effectively cooling the fluid to the desired extent due to the extremely small flow rate of the fluid.

4. A system, as aforesaid, which permits for more accurate and uniform control over the flow rate of the fluid even as the fluid and the overall system undergo substantial variations in temperature.

5. A system, as aforesaid, wherein the flow control device, namely the thermal bushing, is designed to compensate for temperature increases in the fluid so that, as the temperature increases, the clearance passage between the thermal bushing and the shaft progressively decreases even as the viscosity of the flushing fluid decreases, so that the flow rate of fluid through the system thus remains substantially constant at the desired low flow rate.

6. A system, as aforesaid, wherein the thermal bushing is positioned at the interface between the mechanical seal cavity and the pumping chamber so as to function as a barrier between these cavities, while at the same time permitting the flushing fluid to flow from the mechanical seal cavity past the thermal bushing directly into the pumping chamber to thereby resupply the fluid to the pumping system, thereby simplifying the overall environmental cooling system and the hardware and equipment required therefor.

7. A system, as aforesaid, which is operationally and structurally simple due to the utilization of a thermal bushing and an air-cooled heat exchanger for permitting the desired cooling of the flushing fluid while controlling the flow rate at an extremely low magnitude, which is of minimum size and minimum operational complexity by permitting the use of a simple and inexpensive aircooled heat exchanger in contrast to a water-cooled heat exchanger, which permits successful and dependable operation over long periods of time with the use of hot dirty liquids, which permits the utilization of a flow rate several times smaller than that previously thought feasible, and which permits the small flow rate of the fluid to remain substantially constant even though the overall system and apparatus undergoes substantial variation in temperature.

Other objects and purposes of the invention will be apparent to persons familiar with general systems of this type upon reading the following specification and inspecting the accompanying drawings.

BRIEF DESCRIPTION OF THE DRAWINGS

FIG. 1 diagrammatically illustrates a mechanical seal assembly having a bypass flush system associated therewith.

FIG. 2 is an enlargement of a portion of FIG. 1 and showing the mechanical seal assembly having a thermal bushing associated therewith.

FIG. 3 is an enlarged fragmentary sectional view of the thermal bushing.

Certain terminology will be used in the following description for convenience in reference only and will not be limiting. For example, the words "upwardly," "downwardly," "rightwardly" and "leftwardly" will refer to directions in the drawings to which reference is made. The words "inwardly" and "outwardly" will refer to directions toward and away from, respectively, the geometric center of the system and designated parts thereof. Said terminology will include the words specifically mentioned, derivatives thereof and words of similar import.

SUMMARY OF THE INVENTION

The objects and purposes of the present invention, including those delineated above, have been met by providing an improved bypass flush system for cooling and lubricating a mechanical seal assembly as used in association with a fluid handling apparatus, such as a centrifugal pump. The bypass system includes a bypass line which connects the mechanical seal assembly and the discharge side of the pump for permitting recirculation of a limited quantity of the fluid being pumped. To control the flow of bypass fluid and to permit the flow rate of this fluid to be minimized, a flow control device is disposed between the seal assembly and the pumping chamber. This flow control device comprises a thermal bushing which permits the bypass system to operate with a minimum flow rate, while at the same time allowing accurate control of the small flow rate, without the device becoming plugged with deposits and the like. Use of the thermal bushing for flow control also enables the bypass system to employ an air-cooled heat exchanger for cooling the fluid flowing through the bypass line, thereby minimizing the size, cost and complexity of the overall system. In a preferred embodiment, the thermal bushing comprises an inner carbon sleeve which is press-fit within a steel mounting sleeve. This composite sleeve assembly has an expansion rate slightly less than the thermal expansion rate of the shaft which it surrounds, whereby the clearance between the shaft and the carbon sleeve gradually and progressively decreases in response to temperature increases. This results in the thermal bushing permitting a relatively uniform rate of flow therethrough since, as the temperature of the fluid increases, its viscosity decreases.

DETAILED DESCRIPTION

Referring to the drawings, FIG. 1 illustrates a fluid handling apparatus 6, specifically a centrifugal pump, having a housing 7 defining a pump chamber 8 in which is positioned a movable pumping member 9 in the form of a rotary impeller. An inlet opening 11 permits the supply of fluid to the pumping chamber, and an outlet opening 12 permits the pumped fluid to be discharged into a discharge line 13.

The pumping impeller 9 is secured to one end of an elongated rotary shaft means 14, which shaft means is rotataby supported within a sleevelike housing part 17 which is fixedly secured relative to the pump housing. A conventional mechanical seal assembly 17 cooperates between the shaft means 14 and the housing part 16 to prevent leakage of the pumped fluid along the shaft means.

The mechanical seal assembly includes, as illustrated in FIG. 2, a first seal ring 18 which is fixedly related to the housing and a second seal ring 19 which is nonrotatably but slidably supported with respect to the shaft means. These seal rings 18 and 19 have the opposed faces thereof urged into slidable sealing engagement so as to define a seal area 21 therebetween. Springs 22 coact between the seal ring 19 and a collar 23 which is fixedly related to the shaft means 14 for urging the two seal rings into sealing engagement with one another.

The structure and operation of the mechanical seal assembly 17 is conventional, and is thus believed to require no additional description. Reference is made to U.S. Pat. No. 3 467 396 which discloses an extremely similar mechanical seal assembly.

To both cool and lubricate the mechanical seal assembly 17, same is provided with an environmental control system formed as a bypass flushing system 26 which includes a bypass line 27 connected to the main discharge line 13. The line 27 has a heat exchanger 28 associated therewith which, according to the prevent invention, is an air-cooled heat exchanger. The bypass line 27, after passing through the heat exchanger 28, is connected to a port 29 associated with the housing whereby the fluid passing through the bypass line flows into a seal cavity or chamber 31 as defined within the housing part 16 in surrounding relationship to the mechanical seal assembly 17.

To create a barrier between the seal cavity 31 and the pumping chamber 8, the present invention provides a flow control device 31 disposed therebetween and in surrounding relationship to the shaft means 14. The flow control device 32 is formed as a radially floatable thermal bushing assembly 36 which substantially isolates the seal cavity 31 from the pumping chamber 8 while at the same time permits a uniform and controlled flow of flushing fluid from cavity 31 into pumping chamber 8 at a very low rate.

The thermal bushing assembly 36 is formed by an inner bushing sleeve 37 which is preferably formed of carbon graphite, whereby it thus does not cause excessive wear of the outer surface of the shaft means 14. This carbon sleeve 37 has a bore 38 therethrough which is of a diameter only slightly larger than the external diameter of shaft means 14 so as to result in the formation of a narrow annular clearance 39 therebetween. This clearance 39 thus functions as the control passage for restricting flow from seal chamber 31 into pumping chamber 8. The passage 39 typically has a radial width of no more than several thousandths of an inch, such as from 0.001 to 0.002 inch.

The inner carbon sleeve 37 is fixedly held within an outer annular sleeve or holder 41 which is constructed of metal and has the inner carbon sleeve 37 fixed thereto, as by being shrunk into the metal holder 41. More specifically, the outer diameter of carbon sleeve 37 is greater than the inner diameter of metal holder 41 when they are both at the same temperature. The metal holder 41 is heated to a high temperature so as to sufficiently expand to accommodate the carbon sleeve 37 therein, whereupon cooling of the metal holder 41 results in sufficient shrinkage thereof so that the carbon sleeve 37 is fixedly held therein. The metal holder 41 and carbon sleeve 37 are provided with selected section moduli and thermal expansion rates so that the resultant composite thermal sleeve assembly 36 has substantially the same expansion rate as the metal holder 41. This is significant since the carbon sleeve, if permitted to expand by itself, has a thermal expansion rate which is several times smaller than the expansion of steel, so that the carbon sleeve would destroy the desired radial dimension of the clearance passage 39. By having the carbon sleeve 37 shrunk into the metal holder 41, the carbon sleeve does not significantly effect the radial dimension of the clearance passage 39, even though the overall bushing assembly 36 undergoes substantial temperature variation since the thermal expansion of the bushing assembly is thus controlled by the metal holder 41.

To axially restrain the thermal bushing assembly 36, there is provided an annular expansion collar 42 which is fixedly related to the housing part 16, so that the thermal bushing assembly 36 is thus axially restrained between this collor 42 and the opposed sidewall 43 as formed on the housing part 16. The collar 42 is provided, in a conventional manner, with a radial split extending therethrough, and a tapered screw 44 is engaged with the collar in the vicinity of this split so that rotation of the screw 44 into the collar causes the collar to radially expand and thereby become fixedly secured to the surrounding housing part 16. Collar 42 has one or more pins 46 fixed thereto and projecting axially thereof into a narrow radially extending groove 47 formed in one face of the metal holder 41. This maintains the thermal bushing assembly 36 in a nonrotatable relationship with respect to the housing, whereas the radial length of groove 47 permits the thermal bushing assembly to radially float in order to adjust for deflections or deformations of the shaft means 14. Springs 48 coact between collar 42 and holder 41 for continuously urging the thermal bushing assembly 36 into snug bearing engagement with the housing sidewall 43.

According to the present invention, the metal holder 41 and the shaft means 14 are preferably constructed of dissimilar metals so that the metal holder 41 (and the composite thermal bushing assembly 36) will have a thermal expansion coefficient which is at least slightly smaller than the thermal expansion coefficient of the shaft means 14. Thus, as the temperature of the assembly and of the flushing fluid rises, the viscosity of the flushing fluid decreases, and there is a corresponding decrease in the radial width of passage 39, whereby there is thus obtained a nearly constant flow rate through the passage 39 even though the properties of the fluid and the temperature of the system undergoes substantial variation. In this manner, the thermal bushing assembly 36 compensates for viscosity changes in the fluid as a result of temperature variation. When dealing with flow rates less than two gallons per minute (and preferably one gallon per minute or less), and radial clearances in the order of 0.001 to 0.002 inch, this is obviously significant since any substantial change in the viscosity of the fluid without a corresponding compensating variation in the clearance would result in the flow rate through the thermal bushing assembly increasing several times in magnitude, whereupon the aircooled heat exchanger 28 would be unable to sufficiently cool the bypass fluid so that the mechanical seal assembly would be subject to over-heating.

To accomplish the above, the metal holder 41 is manufactured from a material having a thermal expansion rate between 1.0 and 0.5 times that of the shaft sleeve 14B (or the shaft 14 if of one-piece construction). The preferred thermal expansion rate of the holder 41 (and of the thermal bushing 36) is between 0.9 and 0.6 times that of the shaft sleeve.

As an example, the shaft means 14 is normally constructed of a metal having a coefficient of thermal expansion greater than that of the metal holder 41. As illustrated in FIG. 3, this is accomplished by constructing shaft means 14 of a composite structure formed by an inner shaft 14A having a shaft sleeve 14B disposed therearound. The shaft sleeve 14B is preferably constructed from stainless steel (such as 316 stainless steel). As is well known, stainless steel has a coefficient of thermal expansion which is approximately $10 \times 10^{-6}$ inch/inch/°F. This is substantially larger than the coefficient of thermal expansion for conventional steels. The metal holder 41, on the other hand, is constructed from a material having a smaller coefficient of thermal expansion. As an example, the metal holder 41 is preferably constructed from a high nickel alloy normally referred to as hastelloy, which has a coefficient of thermal expansion of approximately $6 \times 10^{-6}$ inch/inch/°F. Since the carbon sleeve 37 is shrunk into the metal holder 41, the resultant thermal bushing assembly 36 thus has a thermal expansion coefficient substantially the same as the holder 41. Thus, due to the difference in the thermal expansion rate between the shaft sleeve 14B and the thermal bushing assembly 36, the radial dimension of the clearance passage 39 thus progressively decreases as the temperature of the fluid and of the thermal bushing increases, thereby permitting a substantially constant flow rate to be maintained through the passage 39.

Further, even though the system is utilized for handling hot, dirty liquids, such as crude, Dowtherm, Therminol and like fluids which coke and carbonize at high temperatures, nevertheless the system of this invention is still able to utilize an extremely small flow rate through the bypass system since it has been experimentally observed that the narrow clearance passage 39 remains free of deposits and debris even though this passage is of an extremely small radial dimension. It is believed that the normal rotation and vibration of the shaft are sufficient to prevent plugging of this narrow clearance passage 39, thereby allowing for accurate control over the extremely small flow rate of the flushing fluid, which flow rate has been experimentally measured as being less than one gallon per minute.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In combination, comprising:
a fluid handling apparatus having housing means defining therein a fluid receiving chamber, rotatable shaft means projecting into said chamber, and fluid contacting means movably disposed within said chamber and mounted on said shaft means for rotation therewith;
a sleevelike housing structure disposed in surrounding relationship to said shaft means and fixedly connected to said housing means;
a mechanical seal assembly coacting between said shaft means and said housing structure, said mechanical seal assembly including a first annular seal member surrounding and nonrotatably connected to said shaft means and a second annular seal member surrounding said shaft means and nonrotatably mounted relative to said housing structure, said first and second annular seal members having opposed seal faces maintained in slidable sealing engagement with one another, said housing structure and said shaft means defining therebetween a seal cavity which is located between said mechanical seal assembly and said chamber; and
environmental control means for said mechanical seal assembly, said control means comprising a liquid type bypass flush system having bypass conduit means connected between the discharge of said fluid handling apparatus and said seal cavity for permitting some of the liquid discharged from said fluid handling apparatus to be supplied into said seal cavity, the improvement wherein said bypass flush system includes,
air-cooled heat exchanger means associated with said bypass conduit means for cooling the liquid which flows therethrough.
a flow control device for permitting substantially continuous flow through said bypass conduit means into said seal cavity, said flow control device being located between said seal cavity and said chamber for restricting flow of liquid from said seal cavity into said chamber,
said flow control device comprising a thermal bushing assembly disposed in surrounding relationship to said shaft means and radially spaced therefrom to define a narrow annular flow control passage therebetween, said thermal bushing assembly comprising an inner annular sleeve of carbon material having an annular metal retainer shrunk therearound, and holding means coacting with said thermal bushing assembly for holding same nonrotatable with respect to said housing structure.

2. The combination according to claim 1, wherein said holding means permits said thermal bushing assembly to radially float with respect to said housing structure.

3. The combination according to claim 1, wherein said annular metal retainer has a thermal coefficient of expansion which is at least slightly smaller than the thermal coefficient of expansion of said shaft means so that the radial dimension of said annular flow control passage decreases as the temperature increases.

4. The combination according to claim 3, wherein said holding means permits said thermal bushing assembly to radially float with respect to said housing structure so that said thermal bushing assembly remains substantially concentric with respect to said shaft means.

5. The combination according to claim 4, wherein said shaft means includes an outer shaft sleeve constructed of stainless steel, said shaft sleeve having a thermal coefficient of expansion at least slightly greater than the thermal coefficient of expansion of said annular metal retainer.

6. The combination according to claim 4, wherein said thermal bushing assembly restricts the flow rate through said bypass system to no more than two gallons per minute.

7. The combination according to claim 1, wherein the rate of flow through the bypass system is controlled solely by said thermal bushing assembly.

8. In combination with a mechanical seal construction for use between a housing means and a shaft means extending therethrough and rotatable relative thereto, wherein said mechanical seal construction has a pair of annular sealing members disposed in surrounding relationship to said shaft means and having mutually contacting sealing faces, one sealing member being fixed with respect to said housing means and the other sealing member being capable of rotation in response to rotation of said shaft means, and a cooling system for supplying a liquid into the seal cavity defined between said shaft means and said housing means for cooling said sealing members, wherein said cooling system includes supply conduit means connected to said seal cavity for supplying said liquid thereto and heat exchanger means associated with said supply conduit means for cooling the liquid flowing therethrough, comprising the improvement wherein said cooling system includes:

thermal bushing means positioned within said seal cavity and operatively coacting between said housing means and said shaft means for permitting a substantially continuous discharge of said liquid from said sealing cavity at a low controlled flow rate, said thermal bushing means being nonrotatably associated with said housing means and positioned in surrounding relationship to said shaft means for defining an annular flow passage between said shaft means and said thermal bushing means of extremely small radial dimension for controlling the discharge of said liquid from said seal cavity;

said thermal bushing means being of a composite construction and including an inner sleeve positioned so as to closely surround said shaft means and being constructed of carbon, and an outer support sleeve surrounding and fixedly connected to said inner sleeve, said inner and outer sleeves having an interference fit therebetween so that said inner sleeve is maintained in a compressively prestressed condition;

said thermal bushing means and its cooperation with said shaft means including means for at leat partially compensating for temperature variations so as to permit a low but substantially constant flow rate of liquid through said passage over a substantial temperature range, said compensating means comprising manufacturing said outer support sleeve and said shaft means from metals which have different thermal expansion coefficients so that the coefficient of said shaft means is at least slightly greater than the coefficient of said outer support sleeve, whereby the radial dimension of said flow passage decreases as the temperature increases so as to at least partially compensate for the decrease in the viscosity of the liquid as its temperature increases.

9. The combination according to claim 8, wherein said heat exchanger means is air cooled.

* * * * *

UNITED STATES PATENT AND TRADEMARK OFFICE
CERTIFICATE OF CORRECTION

PATENT NO. : 4 082 297
DATED : April 4, 1978
INVENTOR(S) : William V. Adams

It is certified that error appears in the above-identified patent and that said Letters Patent are hereby corrected as shown below:

Column 1, Line 40; after "flow" insert ---control---.

Column 2, Line 19; change "therefore" to ---therefor---.

Column 4, Line 18; change "aircooled" to ---air-cooled---.

Column 5, Line 66; change "31" to ---32---.

Column 6, Line 52; change "collor" to ---collar---.

Column 7, Line 26; change "aircooled" to ---air-cooled---.

Column 10, Line 29; change "leat" to ---least---.

Signed and Sealed this

Fifteenth Day of August 1978

[SEAL]

Attest:

RUTH C. MASON
Attesting Officer

DONALD W. BANNER
Commissioner of Patents and Trademarks